United States Patent
Luthe et al.

(10) Patent No.: US 11,390,427 B2
(45) Date of Patent: Jul. 19, 2022

(54) FLAMBEING PASTES

(71) Applicant: WINDPLUSSONNE GMBH, Gronau (DE)

(72) Inventors: Gregor Luthe, Gronau (DE); Nele Schmidt, Vreden (DE); Robert Meyer, Gronau-Epe (DE)

(73) Assignee: WINDPLUSSONNE GMBH, Gronau (DE)

( * ) Notice: Subject to any disclaimer, the term of this patent is extended or adjusted under 35 U.S.C. 154(b) by 239 days.

(21) Appl. No.: 16/094,202

(22) PCT Filed: Apr. 19, 2017

(86) PCT No.: PCT/EP2017/000496
§ 371 (c)(1),
(2) Date: Oct. 16, 2018

(87) PCT Pub. No.: WO2017/182121
PCT Pub. Date: Oct. 26, 2017

(65) Prior Publication Data
US 2019/0092532 A1    Mar. 28, 2019

(30) Foreign Application Priority Data
Apr. 20, 2016   (DE) .......................... 102016004698.8

(51) Int. Cl.
B65D 35/22      (2006.01)
C10L 7/04       (2006.01)
(Continued)

(52) U.S. Cl.
CPC ............... *B65D 35/22* (2013.01); *A23L 5/00* (2016.08); *A23L 5/10* (2016.08); *A23L 13/03* (2016.08);
(Continued)

(58) Field of Classification Search
CPC .. A23L 13/03; A23L 13/06; A23L 5/10; A23P 20/10; A23P 20/15; A47G 19/183;
(Continued)

(56) References Cited

U.S. PATENT DOCUMENTS 1,535,529 A   4/1925   Hopkins
3,239,105 A   3/1966   Woodson
(Continued)

FOREIGN PATENT DOCUMENTS

DE    0820268 C     11/1951
DE    2315672 A1    11/1973
(Continued)

OTHER PUBLICATIONS

Schindler, R. (1981). Hawaiian Cookbook. United Kingdom: Dover Publications, p. 141-143 (Year: 1981).*
(Continued)

*Primary Examiner* — Erik Kashnikow
*Assistant Examiner* — Lela S. Williams
(74) *Attorney, Agent, or Firm* — Steinfl + Bruno LLP

(57) ABSTRACT

Flambéing pastes for grilling products, containing at least one gelling agent and/or thickening agent which is soaked and/or gelled by pure alcohol, as well as pure alcohol in a concentration that it maintains the combustion until it is entirely consumed; method for flambéing grilling products, in which a grilling sauce is simultaneously applied with a flambéing paste layer by layer on the product to be grilled and ignites the flambéing paste; a dispenser for the simultaneous, layered application of paste-like grilling sauces and flambéing pastes on the product to be grilled, having a two- or multi-chamber system; and a grilling product that is to be flambéed and has on its surface at least one layer of at least one grilling sauce and, lying thereon, at least one layer of at least one flambéing paste.

6 Claims, 1 Drawing Sheet

(51) Int. Cl.
*A23L 5/10* (2016.01)
*A23L 13/00* (2016.01)
*A23L 5/00* (2016.01)
*A23P 20/18* (2016.01)
*B65D 35/38* (2006.01)

(52) U.S. Cl.
CPC .............. *A23P 20/18* (2016.08); *B65D 35/38* (2013.01); *C10L 7/04* (2013.01); *A23V 2002/00* (2013.01)

(58) Field of Classification Search
CPC . B65D 81/3216; B65D 81/32; A23V 2002/00
USPC ......................................................... 426/523
See application file for complete search history.

(56) References Cited

U.S. PATENT DOCUMENTS

| | | | |
|---|---|---|---|
| 3,786,159 A | | 1/1974 | Sato et al. |
| 3,795,747 A | | 3/1974 | Mitchell et al. |
| 3,964,880 A | | 6/1976 | Siegrist |
| 5,019,414 A | * | 5/1991 | Valdes ..................... A23G 9/42 426/573 |
| 5,501,867 A | * | 3/1996 | Creehan .................. A23P 20/10 426/601 |
| 6,227,837 B1 | | 5/2001 | Keller et al. |
| 8,757,438 B1 | | 6/2014 | Garcia |
| 2004/0026822 A1 | | 2/2004 | Keller |
| 2006/0141115 A1 | | 6/2006 | Uhrig et al. |
| 2007/0029275 A1 | * | 2/2007 | Hantman ........... B65D 81/3288 215/6 |
| 2007/0095702 A1 | | 5/2007 | Park et al. |

FOREIGN PATENT DOCUMENTS

| | | |
|---|---|---|
| DE | 2162045 C3 | 10/1974 |
| DE | 602004007923 T2 | 4/2008 |
| DE | 202015004434 U1 | 11/2015 |
| DE | 202015007804 U1 | 1/2016 |
| GB | 1370815 A | 10/1974 |
| GB | 1406783 A | 9/1975 |
| GB | 2387310 A | 10/2003 |
| JP | 2005318839 * | 11/2005 |
| WO | 98/14319 A1 | 4/1998 |
| WO | 02/051717 A1 | 7/2002 |
| WO | 2005/080215 A1 | 9/2005 |
| WO | 2006/131163 A1 | 12/2006 |
| WO | 2017/182121 A1 | 10/2017 |

OTHER PUBLICATIONS

International Search Report for International Application No. PCT/EP2017/000496 filed Apr. 19, 2017 on behalf of WINDPLUS-SONNE GMBH, dated Oct. 6, 2017. 5 pages. (English Translation + German Original).
Written Opinion for International Application PCT/EP2017/000496 filed on Apr. 19, 2017 on behalf of WINDPLUSSONNE GMBH, dated Oct. 6, 2017. 12 pages. (English Translation + Original).
International Preliminary Report on Patentability for International Application No. PCT/EP2017/000496 filed Apr. 19, 2017 on behalf of WINDPLUSSONNE GMBH, dated Nov. 1, 2018. 15 pages. (English Translation + German Original).
European Office Action for EP Application No. 17732299.7-1005 on behalf of WINDPLUSSONNE GMBH, dated Jun. 12, 2020. 26 pages.
German Office Action for German Application No. 1-2016 004 698.8 filed on behalf of WINDPLUSSONNE GMBH, dated Jun. 13, 2020. 22 pages.
Translation of German Office Action for German Application No. 102016004698.8 filed Apr. 20, 2016 on behalf of WINDPLUS-SONNE GMBH, dated Mar. 26, 2020. 1 Page.
Translation of Response to German Office Action dated Mar. 26, 2020 + New Claims for German Application No. 102016004698.8 filed Apr. 20, 2016 on behalf of WINDPLUSSONNE GMBH, dated Jun. 13, 2020. 8 Pages.

* cited by examiner

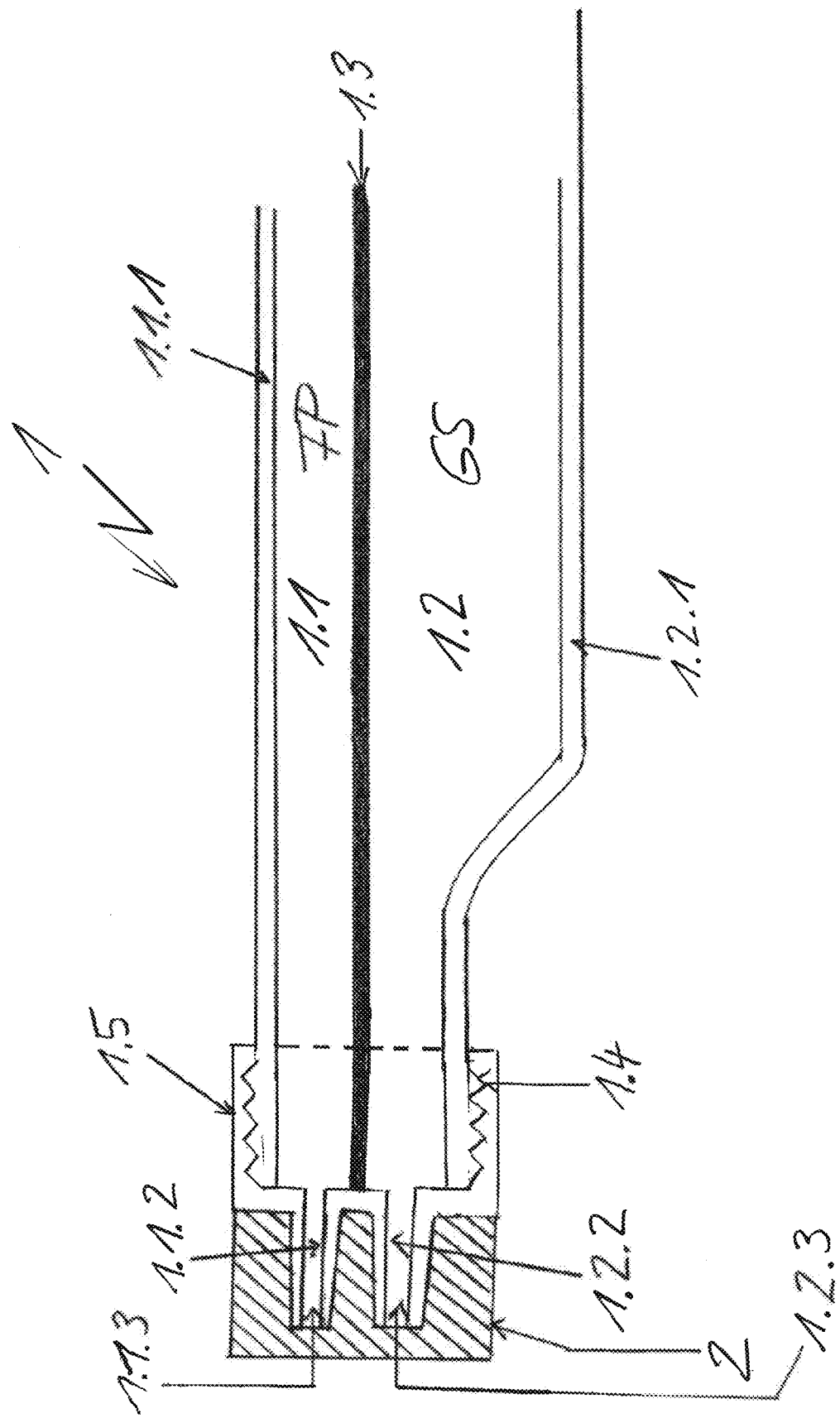

FLAMBEING PASTES

CROSS REFERENCE TO RELATED APPLICATIONS

The present application is the US national stage of International Patent Application PCT/EP2017/000496 filed on Apr. 19, 2017 which, in turn, claims priority to German application 102016004698.8 filed on Apr. 20, 2016.

FIELD OF THE INVENTION

The present invention relates to flambeing pastes.

Moreover, the present invention relates to a method for flambeing a grilling product.

Furthermore, the present invention relates to a dispenser for the simultaneous, separate application of paste-like grilling sauces and flambeing pastes in layers on a grilling product.

BACKGROUND

When flambéing in its simplest form, high-percentage or pure alcohol is poured over the food to be flamed and ignited by means of an ignition source. The alcohol, which has previously spread on the surface of the food to be flamed ignites and burns with a comparatively cool flame. A disadvantage of this process is that it presents a source of danger for deflagration and that neither the alcohol, its dosage nor the spread of the flames can be precisely controlled so that the process requires therefore much practice and experience. In particular, the method is not suitable for the mass production of flambeed foods such as a grilling product, which must be produced as quickly as possible with a high throughput in large quantities, such as at public festivals.

As a consequence, there has been no lack of attempts in order to develop alternatives, such as hand flambe burners or caramelizers. However, these cannot be used for the purpose above described purpose.

Various methods of cooking foods containing methylated spirits have also been proposed. From the translation of the European patent DE 60 2004 007 923 T2 a method for cooking food arranged in a container is described, in which the food is flushed with a predetermined volume of denatured alcohol with the addition of aromatics and the alcohol is ignited and burned completely. However, the use of denatured alcohol raises toxicological problems.

From the two utility models DE 20 2015 007 804 U1 and DE 20 2015 004 434 U1 an arrangement for production of a cocoa-containing beverage is known, which is reminiscent in its configuration to the production of fire tongs punch. Here, a container for a drinkable liquid is provided with a carrier positionable above the liquid for receiving an edible ingredient to be dissolved in the drink. Within this first ingredient, a second edible ingredient is soaked in high-percentage alcohol, which flambees liquefying the first and second ingredients so that the ingredients drip into the drinking fluid.

British Patent Application GB 2387310 A discloses a cooking liquid which is prepared by mixing demineralized water, granulated sugar, mettesoro, fruit juices, natural flavorings, alcohol, vegetables, herbs and fruit additives in a sterile environment. The cooking liquid is suitable for storage and packaging in a steel tank, glass bottles and other containers. The liquid accelerates the cooking process and reduces the risk during flambéing. The cooking liquid can be added to any commercial or home-made sauces, soups, main courses or desserts. Ultimately, however, it must be poured over the food just like pure alcohol, making it difficult to control its distribution in and on food.

From German patent DE 2162045 a process for the preparation of a consumable alcoholic solid in powder form is known. In this case, a mixture of alcohol, water and edible water-soluble material is prepared and spray-dried. For example, whiskey powder can be mixed with a chewing gum base and used as a raw material for a variety of confectionery, for instant drinks, etc.

German publication DE 2315672 likewise discloses alcohol-containing powder compositions. The alcohol content of the powders is so high that they are flammable and continue to burn. For example, one can sprinkle a powder of alcoholic dextrin over a grilled steak and light up. The material burns with a controlled blue flame and is extinguished before too much charring can occur.

However, the alcohol-containing powders have the disadvantage that they distribute with difficulty in an even manner on the surface of the food to be grilled. This can lead to local accumulations of powders, which develop a lot of heat when flaming and burn the food selectively. In addition, it is not known how the known alcohol-containing powders interact with pasty grilling sauces during flambéing. However, there is a fear here as well that local accumulations of powders locally damage the consistency and the taste of grilling sauces.

Two- and multi-chamber tubes have been known for a long time and have become indispensable in our everyday lives. An example of many of these are toothpaste tubes. Few examples may suffice as prior art documentation: U.S. Pat. Nos. 1,535,529 and 3,239,105, German Patent No. 820,268- or, more recently, International Patent Applications WO 98/14319, WO 02/051717 A1, WO 2005/080215 A1 or WO 2006/131163 A.

THE OBJECT OF THE PRESENT INVENTION

The object of the present invention is to provide a new alcoholic paste for flambéing, the alcohol content of which can be precisely adjusted, so that the alcohol on the grilling sauces to be flambéed—both in terms of quantity and location—can be dosed exactly and therefore no longer raises security problems. In addition, the new alcoholic flambeing paste should no longer have the disadvantages of alcohol-containing powders, but it should be distributed as a separate layer in an even manner on grilling sauces, burn evenly and prevent fire damage and charring on the grilling sauces and grilling products.

In addition, the present invention is based on the object to find new combinations of pasty grilling sauces and flambeeing pastes that are so far difficult, if at all possible, to produce, store and apply.

Furthermore, an object of the present invention is to find new dispensers for simultaneous, separate application of flambeing pastes and pasty grilling sauces in layers on a grilling product, which are, inter alia, suitable for large turnovers, such as at folk festivals and celebrations.

Last but not least, the present invention is based on the object of providing a flambeeing process for grilling, without posing security problems.

The Solution According to the Invention

Accordingly, flambeing pastes have been found for grilling products, that contain at least one gelling agent and/or thickening agent soaked and/or gelled by pure alcohol and pure alcohol in a concentration to maintain combustion until fully consumed.

In the following, the flambeing pastes will be referred to as "flambeing pastes according to the invention".

In addition, a method for flambéing grilling products has been found, wherein at least one pasty grilling sauce is applied to the grilling product simultaneously and separately with at least one flambeing paste according to the invention, so that—superimposed in such order—it results in at least one separate layer of at least one flambeing paste and at the same time in at least one separate layer of at least one pasty grilling sauce, and the flambeeing paste according to the invention is ignited with an ignition source.

In the following, the process for flambéing grilling products is referred to as "flambéing process according to the invention".

Last but not least, a dispenser for the simultaneous application of pasty grilling sauces and flambeeing pastes according to the invention on the grilling product has been found, which includes a two- or multi-chamber system and where the at least one pasty grilling sauce is applicable to the grilling product at the same time and separately from the at least one flambeing paste according to the invention, so that—superimposed in that order—at least one separate layer of at least one pasty grilling sauce and at least one separate layer of at least one flambeing paste can be obtained at the same time.

In the following, this dispenser is referred to as a "dispenser according to the invention".

Advantages of the Invention

In view of the prior art, it has been surprising and unforeseeable for the skilled person that the object underlying the present invention could be achieved with the aid of the inventive flambeing pastes, the flambeing process according to the invention and the dispenser according to the invention.

In particular, the alcohol content of the paste according to the invention could be accurately adjusted, so that the alcohol on the grilling sauces to be flaméed—both in terms of quantity and location—could be precisely metered, therefore no longer causing any safety problems.

In addition, the flambeing pastes according to the invention offered the ability to find new combinations of pasty grilling sauces and flambeeing pastes that were so far difficult, if at all possible, to produce, store and apply.

Furthermore, the dispenser according to the invention made it possible to obtain high conversions of flambeed grilling products, such as at folk festivals and celebrations, without posing security problems.

DETAILED DESCRIPTION OF THE INVENTION

The inventive flambeeing paste for grilling products contains at least one gelling agent and/or thickening agent soaked and/or gelled by pure alcohol.

In the context of the present invention, pastes are flowable materials whose properties lie between solids and liquids. They can also be described as highly viscous liquids.

Examples of grilling products are foods such as meat, sausages, fish, crustaceans and vegetables.

Pure alcohol is alcohol that contains no denaturant. However, it may contain water, flavorings, food-approved dyes and other substances commonly used in the spirits field.

In the flambeeing pastes according to the invention, the alcohol is contained in a concentration that maintains the combustion until its complete consumption. The amount of alcohol can vary greatly and is therefore perfectly adapted to the requirements of the individual case, such as taste preferences. The quantities can be determined by simple preliminary tests. In general, they are based on the total amount of flambeeing pastes according to the invention, at 5 to 50 wt.-%. Prior to the addition of alcohol, the gelling agents and/or thickening agents may be soaked with water.

In principle, all food-approved gelling agents and/or thickening agents can be used. Preferably, the gelling agents and/or thickening agents are selected from the group consisting of gelatin, alginic acid, sodium alginate, potassium alginate, calcium alginate, propylene glycol alginate, agar-agar, carrageenan, furcelleran, locust bean gum, guar gum, tragacanth, gum arabic, xanthan, karaya, tara gum, gellan, pectins, amidated pectins, microcrystalline cellulose, methylcellulose, ethylcellulose, hydroxypropylcellulose hydroxypropylmethylcellulose, methylethylcellulose, carboxymethylcellulose, sodium carboxymethylcellulose, gliadin, secalin, avenin, hordein, zein, oryzine and kafirin and the modified starches E 1400, E 1401, E 1402, E 1403, E1404, E1405, E1410, E1412, E1413, E1414, E1420, E1421, E1422, E1423, E1430, E1440, E1441, E1442, E1450 and E1451.

In addition, the flambeing pastes according to the invention contain spices, flavorings, food approved dyes and/or crushed, preferably pasty, foods such as onion paste as a flavor carrier.

In the flambeing process according to the invention at least one pasty grilling sauce is applied simultaneously and separately with at least one flambeing paste according to the invention in layers on the food, so that—superimposed in this order—it results in at least one separate layer of at least one flambeing paste and at least one separate layer of at least one pasty grilling sauce, according to which the inventive flambeing paste is ignited with an ignition source. Suitable ignition sources are gas burners whose flames burn odorless and without developing soot.

Numerous pasty grilling sauces and seasoning sauces are suitable for the flambéing process according to the invention. Their selection depends on the taste preferences of the consumer of the cooked food. Examples of suitable grilling sauces and seasoning sauces are A1 steak sauce
oyster sauce
BBQ sauce
  classic
  spicy
  roasted garlic
  honey
  sweet
  smokey and firey
chili sauce
chimichumi
chutney
cumberland sauce
fish sauce
fruit mustard sauce
garum
hoisin sauce
HP sauce
ketchup
  curry
  chili with different degrees of strength
  spices 50% less sugar
organic
Maggi spice
pesto
relish
sambal
S-chug
mustard
Sriracha sauce
soy sauce
Tabasco sauce
teriyaki sauce
Worcestershire sauce
sweet and hot
Peri Peri
Spanish creamy and spicy
French fries sauce
three pepper
cocktail sauce
garlic sauce
exotic sauce
curry-mango Sauce
American sauce
hot sauce
Asia-sweet-sour
curry sauce
green-pepper sauce
honey-mustard-dill sauce
Caribbean sauce
spicy tomato sauce
shashlik sauce
Mexican sauce
chili-mango sauce
garlic sauce Wasabi style
garlic jalapeno sauce
burger sauce The above sauces contain mostly food additives, which may be flavoring and/or have other functions. Furthermore, many sauces contain other food additives, such as preservatives, thickeners, acidity regulators, colorants and/or stabilizers.

The dispenser according to the invention is preferably used for the flambeing method according to the invention, since it allows the pasty grilling sauces and the flambeing pastes according to the invention to be applied simultaneously and separately to the grilling food. The simultaneous, separate application can be very well controlled with the dispenser according to the invention.

The dispenser according to the invention comprises a two-chamber or multi-chamber system in which the volume or volumes of the chamber or chambers containing at least one flambeing paste according to the invention is smaller than or equal to the volume or volumes of the chamber or chambers which contain at least one pasty grilling sauce.

The at least one, in particular one, chamber of the at least one, in particular one, flambeeing paste and the at least one, in particular one, chamber of the at least one pasty grilling sauce can have an airtight sealable, common outlet nozzle. The common exit nozzle may be a nozzle with a circular or oval exit hole. The outlet nozzle may also be a slot die.

In this embodiment of the dispenser according to the invention, at least one, in particular one, chamber containing at least one, in particular one, pasty grilling sauce, is surrounded by at least one chamber containing at least one flambeing paste, whereby the exiting paste strand has the desired layer structure, in which a layer of at least one, in particular one, flambeing paste wraps a strand of at least one, in particular one, grilling sauce.

In a further embodiment, the at least one, in particular one, chamber of the at least one, in particular one, flambeeing paste and the at least one, in particular one, chamber of the at least one, in particular one, pasty grilling sauce can each have their own airtightly closable outlet nozzle. The at least two, in particular two, outlet nozzles are preferably conical hollow cones, wherein they preferably have a circular or an oval outlet hole. The outlet nozzles can also be slot dies.

They are preferably the same length. In this case, the at least one, in particular one, outlet nozzle for the flambeing paste has a smaller diameter than the outlet nozzle for the at least one, in particular one, grilling sauce. In addition, the at least two, in particular two, outlet nozzles can be arranged parallel to one another or inclined relative to one another.

Each outlet nozzle may have its own closure, or else a closure may be used, which can simultaneously occlude at least two, in particular two, outlet nozzles.

For the layered application of the at least one, in particular one, flambeing paste, and the at least one, in particular one, pasty grilling sauce, the dispenser is held so that the at least one, in particular one, outlet nozzle for the at least one, especially one, flambeeing paste is located above the outlet nozzle for the at least one, especially one, pasty grilling sauce. In this way, it results in a flat layered structure in which the layers are superimposed as follows:

surface of the grilling product/pasty grilling sauce/pasty flambeeing paste when the dispenser is moved from above across the grilling product.

The simultaneous separate exit of the at least one, in particular one, flambeing paste and at least one, in particular one, pasty grilling sauce can be prepared and regulated by the construction of external and/or internal pressure on the chambers and/or in the chambers. For this purpose, the dispenser according to the invention can be made of flexible materials, preferably plastics, which can be pressed together and optionally return to their original shape. If an internal pressure is to be built up, the dispenser according to the invention is preferably made of metal.

The embodiments described below are exemplary only and not exhaustive. The examples are therefore intended to illustrate the variety of possibilities, and the skilled person can readily specify other options due to his general expertise. It is therefore to be understood that the features mentioned above and explained in more detail below can be used not only in the specified combinations and configurations, but also in other combinations and configurations or alone, without departing from the scope of the present invention.

Example 1

Flambeing Paste FP with Pasty Grilling Sauce GS

Gelatin and alcohol are mixed to make flambeing paste FP. For this purpose, the gelatin is soaked in water for 10 minutes. The alcohol is warmed slightly and stirred into the soaked gelatin until a homogeneous mixture is formed. The mixing ratio could be adjusted as required, depending on how tightly or viscous one wants the flambeing paste FP to be adjusted.

In parallel to this, a grilling sauce is prepared as grilling sauce GS.

The flambeing paste FP and the grilling sauce GS are in a plastic bottle (dispenser 1) filled with two chambers 1.1 and 1.2, which has a common, airtight sealable outlet opening. The chamber 1.1 of the flambeeing paste FP is smaller than that of the grilling sauce GS (chamber 1.2), because the flambeing paste FP should not be dosed one to one with the grilling sauce GS. By pressing the bottle, the sauce GS can be applied with the paste FP on the desired grilling product such as steaks as a string in which the flambeeing paste FP wraps the grilling sauce GS. By lighting the flambeing paste FP, the grilling sauce GS is flambéed and the sugar in the grilling sauce is caramelized. This creates another flavor carrier that makes the cooked grilling product particularly tasty.

Example 2

Dispenser 1 with Flambeing Paste FP and Pasty Grilling Sauce GS

FIG. 1 shows a longitudinal section through a dispenser 1 with two chambers 1.1, 1.2.

In FIG. 1, the reference numerals have the following meaning:
1 plastic dispenser
1.1 chamber for the flambeeing paste FP
1.1.1 chamber wall
1.1.2 conical outlet nozzle
1.1.3 circular exit opening
1.2 chamber for the pasty grilling sauce GS
1.2.1 chamber wall
1.2.2 conical outlet nozzle
1.2.3 circular exit opening
1.3 partition wall
1.4 thread
1.5 screw-on carrier of the outlet nozzle 1.1.2 and 1.2.2
2 removable cap for both outlet nozzles 1.1.2 and 1.2.2
FP flambeeing paste
GS pasty grilling sauce The dispenser 1 is an open top plastic flexible bottle with a flat bottom. It is a total of 30 cm long and its largest diameter is 12 cm. The wall thickness of its chamber walls 1.1.1 and 1.2.1 and of its bottom is 3 mm. The horizontal outline of each chamber wall 1.1.1 and 1.2.1 is a correspondingly sized circular segment. The dispenser 1 is divided, with respect to the two outlet nozzles 1.2.2 and 1.1.2, by a centrally arranged partition 1.3 of the flexible plastic in a chamber 1.1 for the flambeing paste FP of Example 1 and in a chamber 1.2 for the grilling sauce GS of Example 1. The volume ratio of chamber 1.1 to chamber 1.2 is 1:10. The chamber wall 1.2.1 tapers in the direction of the thread 1.4, resulting in the central arrangement of the partition wall 1.3. The two conical outlet nozzles 1.1.2 and 1.2.2 are each 1 cm long and each have a circular outlet opening 1.1.3 and 1.2.3. They are screwed onto the filled open bottle with the help of the screw-on carrier 1.5 (thread 1.4). The two outlet openings 1.1.3 and 1.2.3 are closed by means of the removable cap 2.

Prior to the use of the dispenser 1, the removable closure cap 2 is removed and guided in the use of the dispenser 1 on the food so that the outlet nozzle 1.1.2 is arranged above the outlet nozzle 1.2.2. By pressure on the chamber walls 1.1.1 and 1.2.1 the flambeing paste FP and the grilling sauce GS are applied simultaneously layer by layer on the grilling product. The flambeeing paste FP is ignited and the grilling sauce flambéed. This caramelizes the sugar that is in the grilling sauce, which results in another flavor carrier that makes the food very tasty.

The invention claimed is:

1. A method for flambeing grilling products, comprising:
applying at least one pasty grilling sauce simultaneously to at least one flambeing paste on a grilling product in a layered order surface of (i) the grilling product, (ii) the at least one pasty grilling sauce, (iii) and the at least one flambeing paste; and
igniting the at least one flambeing paste with an ignition source,
wherein
applying at least one pasty grilling sauce includes using a dispenser comprising a two-chamber or multi-chamber system having a volume of a flambeing paste chamber or chambers configured to contain the at least one flambeing paste that is smaller than a volume of a pasty grilling sauce chamber or chambers configured to contain the at least one pasty grilling sauce,
simultaneous and separate application of pasty grilling sauces and flambeing pastes is obtained and regulated by building up of an external and/or an internal pressure onto or in the at least one flambeing paste chamber or chambers and onto or in the pasty grilling sauce chamber or chambers,
the at least one chamber of the at least one flambeing paste and the at least one chamber of the at least one pasty grilling sauce each comprise an airtight sealable outlet nozzle,
the at least one flambeing paste contains at least one gelling agent and/or thickening agent that is soaked and/or gelled by pure alcohol and
the pure alcohol is in a concentration that maintains combustion until complete consumption of the pure alcohol.

2. The method for flambeing grilling products according to claim 1, wherein applying at least one pasty grilling sauce simultaneously to at least one flambeing paste includes wrapping a strand of the at least one flambeing paste around a strand of the at least one pasty grilling sauce.

3. The method for flambeing grilling products according to claim 1, wherein, for the applying at least one pasty grilling sauce, the airtight sealable outlet nozzle associated with the flambeing paste chamber or chambers are located above the airtight sealable outlet nozzle associated with the pasty grilling sauce chamber or chambers.

4. The method for flambeing grilling products according to claim 3, wherein, for the applying at least one pasty grilling sauce, the airtight sealable outlet nozzle associated with the at least one flambeing paste chamber or chambers is smaller than the airtight sealable outlet nozzle associated with the pasty grilling sauce chamber or chambers.

5. The method for flambeing grilling products according to claim 1, wherein, for the applying at least one pasty grilling sauce, the airtight sealable outlet nozzle is common to both the flambeing paste chamber or chambers and the pasty grilling sauce chamber or chambers.

6. The method for flambeing grilling products according to claim 1, wherein, for the applying at least one pasty grilling sauce, the airtight sealable outlet nozzle associated with the flambeing paste chamber or chambers is separate from the airtight sealable outlet nozzle associated with the pasty grilling sauce chamber or chambers.

* * * * *